(No Model.)   2 Sheets—Sheet 1.
G. G. LYNCH.
DITCHING MACHINE.
No. 244,466.   Patented July 19, 1881.
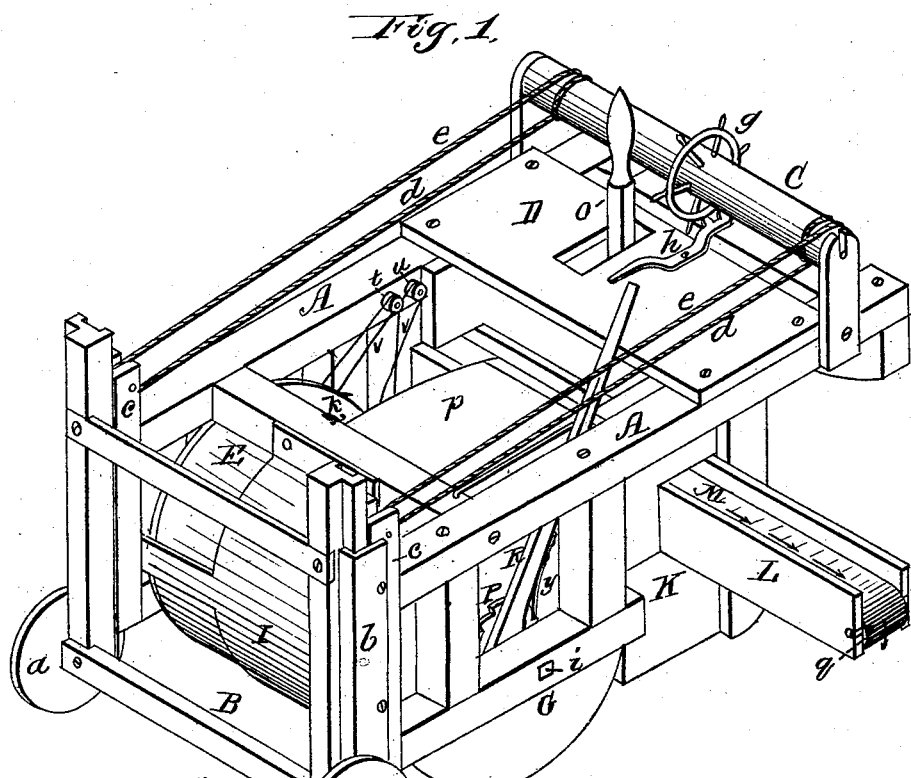
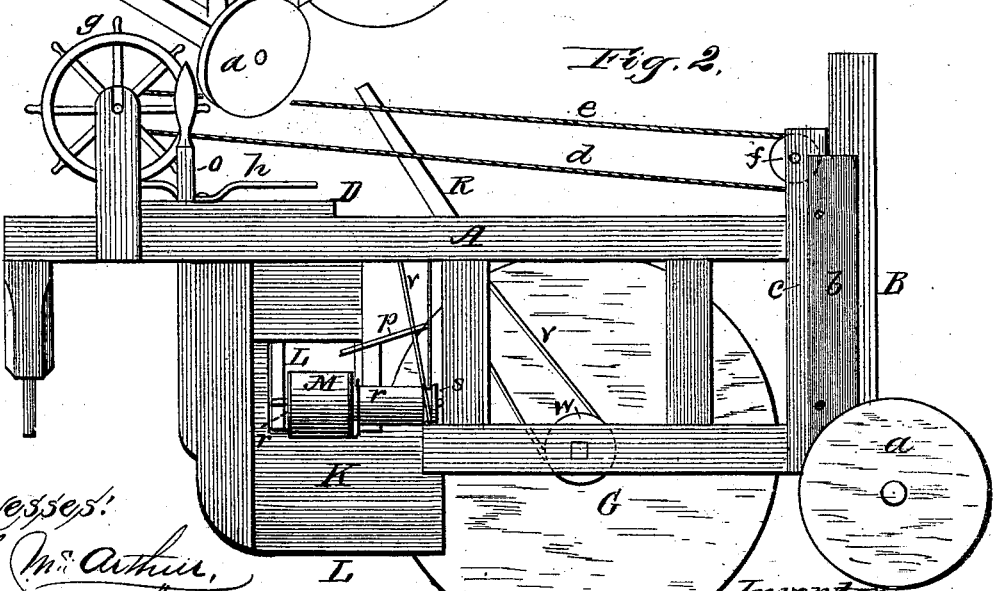
Witnesses:
H. C. McArthur,
Walter Dennis.
Inventor
Garry G. Lynch,
per Chas. H. Fowler,
Attorney
N. PETERS. Photo-Lithographer, Washington, D. C.

(No Model.) 2 Sheets—Sheet 2.
G. G. LYNCH.
DITCHING MACHINE.
No. 244,466. Patented July 19, 1881.
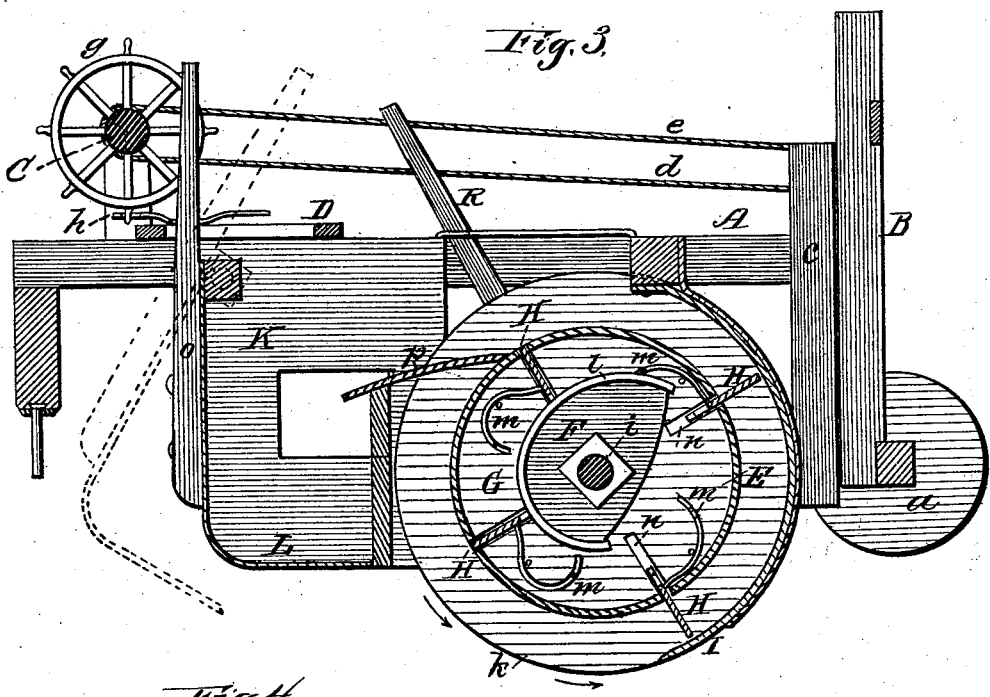
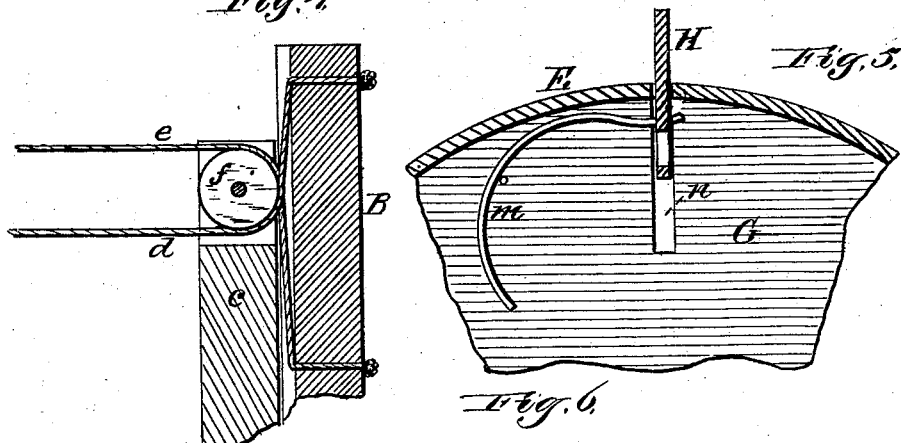
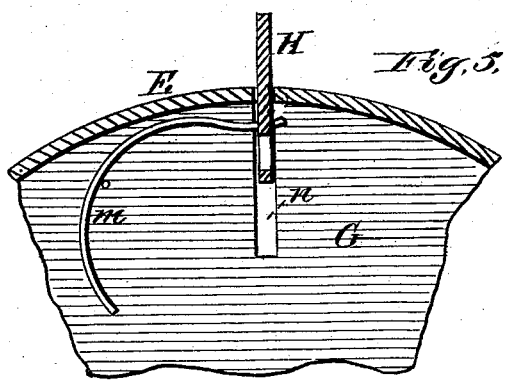
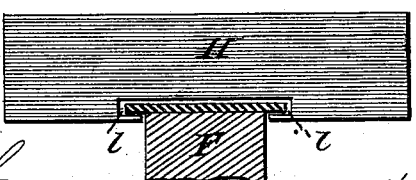
Witnesses:
W. C. McArthur
Walter Dennis
Inventor
Garry G. Lynch,
per Chas. H. Fowler
Attorney.

UNITED STATES PATENT OFFICE.

GARRY G. LYNCH, OF ILLAWARA, LOUISIANA.

DITCHING-MACHINE.

SPECIFICATION forming part of Letters Patent No. 244,466, dated July 19, 1881.

Application filed April 21, 1881. (No model.)

*To all whom it may concern:*

Be it known that I, GARRY G. LYNCH, a citizen of the United States, residing at Illawara, in the parish of East Carroll and State of Louisiana, have invented certain new and useful Improvements in Ditching and Leveeing Machines; and I do hereby declare that the following is a full, clear, and exact description of the same, reference being had to the annexed drawings, making a part of this specification, and to the letters and figures of reference marked thereon.

Figure 1 of the drawings is a perspective view of my invention. Fig. 2 is a side elevation thereof; Fig. 3, a vertical longitudinal section. Fig. 4 is a detail view, in section, showing the connections for raising and lowering the truck-frame. Fig. 5 is a detail view of a portion of the revolving cylinder, the bucket, and spring-connection; and Fig. 6 is a similar view of one of the buckets and end of the cam, showing the two engaging with each other.

The present invention has relation to certain new and useful improvements in rotary ditching-machines, and has for its object to provide means whereby the process of excavating and depositing the earth is greatly facilitated, which object I attain by the construction shown in the drawings and hereinafter described.

In the accompanying drawings, A represents the frame of the machine, to which the several operating parts are connected and by which they are supported.

To the rear of the frame A is connected a vertically-adjustable frame, B, having grooved uprights, carrying at their lower ends the truck-wheels *a*, said frame being guided in its movement by plates *b*, secured to the sides of the standards *c*, and embracing or overlapping the sides of the frame B. The sides of the frame B have connected to them two cords or ropes, *d e*, which cross each other, one passing under and the other over a pulley, *f*, journaled within the slotted ends of the standards. These cords or ropes pass from the pulleys to a windlass, C, to which they are connected, said windlass having a hand-wheel, *g*, or other suitable means for operating it. A clutch, *h*, pivoted to the platform D, engages with the spokes of the hand-wheel *g* and holds the windlass from turning in either direction after the frame B (which I shall term a "truck-frame") has been elevated or depressed.

Although I have shown a windlass and cords or ropes for lowering or elevating the truck-frame, I do not desire to be confined to such means, as in place thereof cog-wheels and pinions may by used, or any convenient means that will admit of the truck-frame being either lowered or raised. I am aware that these vertically-adjustable frames carrying suitable wheels are not new in connection with ditching or excavating machines, and that tongues and grooves have been employed to guide the frames and steady them in their vertical movement. The construction of my invention, as hereinbefore described, differs materially from the construction in common use, as by the addition of the angular plates *b* more strength is given to the parts, also insuring a more perfect adjustability or operation of the frame.

A metal cylinder, E, is loosely mounted upon a stationary axle, *i*, connected to the sides of the frame A. The ends G of the cylinder E project beyond the periphery to form circumferential flanges or rims *k*, as shown in Fig. 3, for cutting into the earth and bringing the outer circumference of the cylinder in contact with the surface of the earth as the machine is being moved along over the same.

The axle *i* has rigidly connected to it by any suitable means a cam, F, with a projecting rim, *l*, upon each side thereof, which engage with the slotted edges of buckets H as the cylinder revolves and brings the buckets in contact with the flanges upon the cam. Each bucket has connected to it one end of a flat spring, *m*; or, if desired, it may simply pass through a hole in the bucket, while the opposite end is fastened by any suitable means to the ends G of the cylinder E. The ends of the cylinder E have radial grooves *n*, to serve as guides for the buckets H, the ends thereof entering the grooves at both ends of the cylinder.

A scraper, I, is connected by any suitable means to the frame A, and has the same general curve as the cylinder E, extending on the same circumferential line with the flanges *k*.

A dirt-box, K, is located at the forward end of the frame A, said box having a pivoted or hinged bottom, L, with handle *o*, by which means the box can be emptied of the dirt when necessary, a chute, p, delivering the dirt as it is taken around by the buckets to the box K. This dirt-box K is dispensed with when the machine is used for ditching, and in place thereof a trough, L, is employed. The trough has at one end a pulley, q, over which passes an endless belt, M, the opposite end of said belt passing over a pulley, r, which has its bearings both in the end of the trough and the frame A. The belt M, being in motion, carries the dirt as it passes from the chute p into the trough L over the end thereof, as indicated by the arrows in Fig. 1.

The pulley r, by which motion is given to the belt M, is driven by pulleys s t u and belt or cord v passing around said pulleys and around a pulley, w, rigidly secured to the end of the revolving cylinder E. Any suitable means, however, may be employed for operating the pulley r and belt M, as found best adapted to the purpose. Spur-gearing also may be used on large machines.

In the operation of the machine, when it is intended to work, the truck-wheels a are raised from the ground by elevating the frame B, this being done by the cords d e and windlass C. This being done, the weight of the machine will embed the flanges k in the ground until the surface of the cylinder rests upon the surface of the ground. As the machine is drawn forward by horses attached to it, the same as a common wagon, the cylinder E is caused to revolve, and the scraper I takes up the dirt, and the bucket H nearest to the edge of the scraper is forced out against the inner side thereof, which carries the dirt up and deposits it on the chute p, where it is emptied into the dirt-box K. The bucket H, which carries up the dirt, passes around with the revolution of the cylinder until the slotted or recessed edge of said bucket engages with the flanges l, and by the action of the cam F the bucket is gradually drawn in the cylinder E until its outer edge is flush with the outer surface thereof. This enables the cylinder E to pass unobstructed by the chute p, the bucket being held within the cylinder until it passes beyond and is disconnected from the lower end of the flanges l. At this point the spring m again forces the bucket outward against the interior surface of the scraper I, to carry up the dirt, as before.

When the dirt-box K is filled the frame B is lowered until the wheels a come in contact with the ground, and the surface of the cylinder raised from contact therewith. In this position the machine is drawn to the place where it is desired to unload, when the handle o is brought back in position shown in dotted lines, Fig. 3, which will empty the box of its contents. When the operation of the cylinder E and buckets H stops, there will always be left a quantity of dirt from the point at which the bucket takes it up to the point of discharge. To empty the dirt thus left around the cylinder, I affix to one side of the cylinder a ratchet-wheel, P, and loosely to the axle i a lever, R, which carries a pawl, y.

The addition of a suitable spring-pawl may be made to prevent the ratchet-wheel from turning backward, or in a reverse direction from that to which the ratchet-wheel is turned by the lever. By this arrangement the cylinder, after being raised from the ground, may be turned back and forth by the lever, which will empty it of the dirt remaining partially around its surface.

Having now fully described my invention, what I claim as new, and desire to secure by Letters Patent, is—

1. The cam F, having flanges l, and rigidly secured to the stationary axle or shaft i, in combination with the revolving cylinder E, the buckets H, having slotted edges to engage with the flanges l, and the springs m, substantially as and for the purpose described.

2. The frame B, having grooved uprights, and carrying the truck-wheels a, in combination with the angular plates b, connected to the standards c, and means, substantially as described, for elevating or lowering said frame, substantially as and for the purpose set forth.

3. The cylinder E, buckets H, springs m, and cam F, in combination with the chute p and dirt-box K, provided with a pivoted or hinged bottom, L, substantially as and for the purpose specified.

In testimony that I claim the above I have hereunto subscribed my name in the presence of two witnesses.

GARRY G. LYNCH.

Witnesses:
A. G. BELDEN,
GEO. A. BARHAM.